United States Patent
Ryan et al.

(10) Patent No.: US 7,113,365 B1
(45) Date of Patent: Sep. 26, 2006

(54) DISK DRIVE COMPRISING A SPINDLE MOTOR HAVING A WINDINGS SHIELD FOR REDUCED DISK VOLTAGE COUPLING

(75) Inventors: Robert P. Ryan, Mission Viejo, CA (US); Alan P. Rice, Santa Ana, CA (US); Jon E. Jacoby, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 313 days.

(21) Appl. No.: 10/329,127

(22) Filed: Dec. 24, 2002

(51) Int. Cl.
*G11B 19/20* (2006.01)

(52) U.S. Cl. ................... 360/99.08; 360/98.07

(58) Field of Classification Search ............ 360/99.08, 360/99.12, 97.02, 97.03, 99.09, 99.11; 310/67 R, 310/51, 90; 720/696, 697
See application file for complete search history.

(56) References Cited

U.S. PATENT DOCUMENTS

| | | | | |
|---|---|---|---|---|
| 5,173,814 A | * | 12/1992 | Elsasser et al. ......... | 360/98.07 |
| 5,296,981 A | * | 3/1994 | Ogawa ................... | 360/99.08 |
| 5,319,270 A | * | 6/1994 | Tanaka et al. ........... | 310/67 R |
| 5,367,416 A | * | 11/1994 | Cossette et al. ......... | 360/97.02 |
| 5,384,677 A | * | 1/1995 | Morehouse et al. ..... | 360/99.12 |
| 5,424,891 A | * | 6/1995 | Oda et al. ............... | 360/128 |
| 5,661,353 A | * | 8/1997 | Erdman et al. .......... | 310/86 |
| 5,783,882 A | | 7/1998 | Brezoczky et al. | |
| 5,949,613 A | * | 9/1999 | Moir et al. ............. | 360/99.08 |
| 6,005,746 A | * | 12/1999 | Papst .................... | 360/98.07 |
| 6,018,438 A | * | 1/2000 | Nottingham et al. .... | 360/98.07 |
| 6,133,655 A | * | 10/2000 | Suzuki et al. ........... | 310/51 |
| 6,344,946 B1 | * | 2/2002 | Papst .................... | 360/99.08 |
| 6,378,874 B1 | * | 4/2002 | Dorulla .................. | 277/410 |
| 6,728,063 B1 | * | 4/2004 | Gustafson et al. ....... | 360/99.08 |
| 6,759,784 B1 | * | 7/2004 | Gustafson et al. ....... | 310/254 |
| 2002/0003678 A1 | * | 1/2002 | Sakuragi et al. ........ | 360/99.08 |
| 2002/0047344 A1 | * | 4/2002 | Herndon et al. ........ | 310/67 R |
| 2002/0070614 A1 | * | 6/2002 | Rehm et al. ............ | 310/43 |
| 2003/0015930 A1 | * | 1/2003 | Ichiyama ............... | 310/90.5 |

* cited by examiner

*Primary Examiner*—Brian E. Miller
(74) *Attorney, Agent, or Firm*—Howard H. Sheerin, Esq.

(57) ABSTRACT

A disk drive is disclosed comprising a disk, a head actuated over a surface of the disk, and a spindle motor for rotating the disk. The spindle motor comprises a ring-shaped stator having a plurality of stator teeth each wound with a winding. The spindle motor further comprises a hub having a plurality of magnets for interacting with the stator teeth to rotate the hub about the shaft when the windings are energized. A ring-shaped shield is disposed in a vertical gap between the windings and the hub to reduce a voltage coupled from the windings to the surface of the disk.

18 Claims, 9 Drawing Sheets

DISK DRIVE COMPRISING A SPINDLE MOTOR HAVING A WINDINGS SHIELD FOR REDUCED DISK VOLTAGE COUPLING

BACKGROUND OF THE INVENTION

1. Field of the Invention

The present invention relates to disk drives. More particularly, the present invention relates to a disk drive comprising a spindle motor having a windings shield for reduced disk voltage coupling.

2. Description of the Prior Art

The windings of the spindle motor within a disk drive induce a voltage which can couple to the surface of the spinning disk and damage magnetoresistive (MR) heads, particularly as the heads shrink in size and become even more sensitive to disk voltages. U.S. patent application Ser. No. 09/865,240 discloses a disk drive which grounds the spindle motor stator to the shaft and/or the base which reduces the disk voltage coupling from the windings of the spindle motor. However, further reduction in the disk voltage coupling is desirable.

SUMMARY OF THE INVENTION

The present invention may be regarded as a disk drive comprising a disk, a head actuated over a surface of the disk, and a spindle motor for rotating the disk. The spindle motor comprises a base, a shaft coupled to the base, and a ring-shaped stator having a planar alignment substantially parallel with the disk. The shaft is disposed axially through the ring-shaped stator. The ring-shaped stator comprises a plurality of stator teeth, wherein a winding is wound around each stator tooth. When the windings are energized, a voltage emanating from the windings being at least partially coupled to the surface of the disk. The spindle motor further comprises a hub comprising a plurality of magnets for interacting with the stator teeth to rotate the hub about the shaft when the windings are energized. The hub comprises a first ring-shaped planar surface positioned over the windings defining a first vertical gap between the windings and the hub. A first ring-shaped shield is disposed in the first vertical gap between the windings and the hub to reduce the voltage coupled to the surface of the disk.

In one embodiment, the first ring-shaped shield comprises a metal, and in one embodiment, the disk drive further comprises a first ring-shaped insulator disposed between the first ring-shaped shield and the windings.

In yet another embodiment, the first ring-shaped shield is grounded to the base to reduce the voltage coupled to the surface of the disk. In an alternative embodiment, the first ring-shaped shield is grounded to the shaft to reduce the voltage coupled to the surface of the disk.

In another embodiment, the ring-shaped stator is grounded to the base to reduce the voltage coupled to the surface of the disk. In an alternative embodiment, the ring-shaped stator is grounded to the shaft to reduce the voltage coupled to the surface of the disk.

In yet another embodiment, the ring-shaped stator comprises a ring-shaped inner diameter and the plurality of stator teeth extend radially outward from the ring-shaped inner diameter. The hub comprises a substantially cylindrical shape comprising a substantially closed top end and a substantially open bottom end. An interior circumferential surface of the hub proximate the substantially open bottom end comprises a plurality of magnets. A diameter of the hub proximate the magnets is greater than a diameter of the ring-shaped stator. The magnets interact with a distal end of the stator teeth to rotate the hub about the shaft when the windings are energized with current.

In still another embodiment, the ring-shaped stator comprises a ring-shaped outer diameter and the plurality of stator teeth extend radially inward from the ring-shaped outer diameter, and the hub comprises a substantially cylindrical shape. An exterior circumferential surface of the hub comprises a plurality of magnets, and a diameter of the hub proximate the magnets is less than a diameter of the ring-shaped stator. A diameter of the hub above the magnets extends radially outward to form the first ring-shaped planar surface positioned over the windings defining the first vertical gap between the windings and the hub. The magnets interact with a distal end of the stator teeth to rotate the hub about the shaft when the windings are energized with current.

In another embodiment, the ring-shaped stator comprises a ring-shaped inner diameter and the plurality of stator teeth extend radially outward from the ring-shaped inner diameter. The hub comprises a substantially cylindrical shape comprising a substantially closed top end and a substantially closed bottom end. An interior circumferential surface of the hub comprises a plurality of magnets, and a diameter of the hub proximate the magnets is greater than a diameter of the ring-shaped stator. The substantially closed top end forms the first ring-shaped planar surface positioned over the windings defining the first vertical gap between the windings and the hub. The substantially closed bottom end forms a second ring-shaped planar surface positioned below the windings defining a second vertical gap between the windings and the hub. A second ring-shaped shield is disposed in the second vertical gap between the windings and the hub to reduce the voltage coupled to the surface of the disk. The magnets interact with a distal end of the stator teeth to rotate the hub about the shaft when the windings are energized with current.

The present invention may also be regarded as a spindle motor for rotating a disk in a disk drive. The disk drive comprising a head actuated over a surface of the disk. The spindle motor comprises a base, a shaft coupled to the base, and a ring-shaped stator having a planar alignment substantially parallel with the disk wherein the shaft is disposed axially through the ring-shaped stator. The ring-shaped stator comprises a plurality of stator teeth, wherein a winding is wound around each stator tooth. When the windings are energized, a voltage emanating from the windings being at least partially coupled to the surface of the disk. The spindle motor further comprises a hub comprising a plurality of magnets for interacting with the stator teeth to rotate the hub about the shaft when the windings are energized. The hub comprises a first ring-shaped planar surface positioned over the windings defining a first vertical gap between the windings and the hub. A first ring-shaped shield is disposed in the first vertical gap between the windings and the hub to reduce the voltage coupled to the surface of the disk.

DESCRIPTION OF THE PREFERRED EMBODIMENTS

Figure 1:
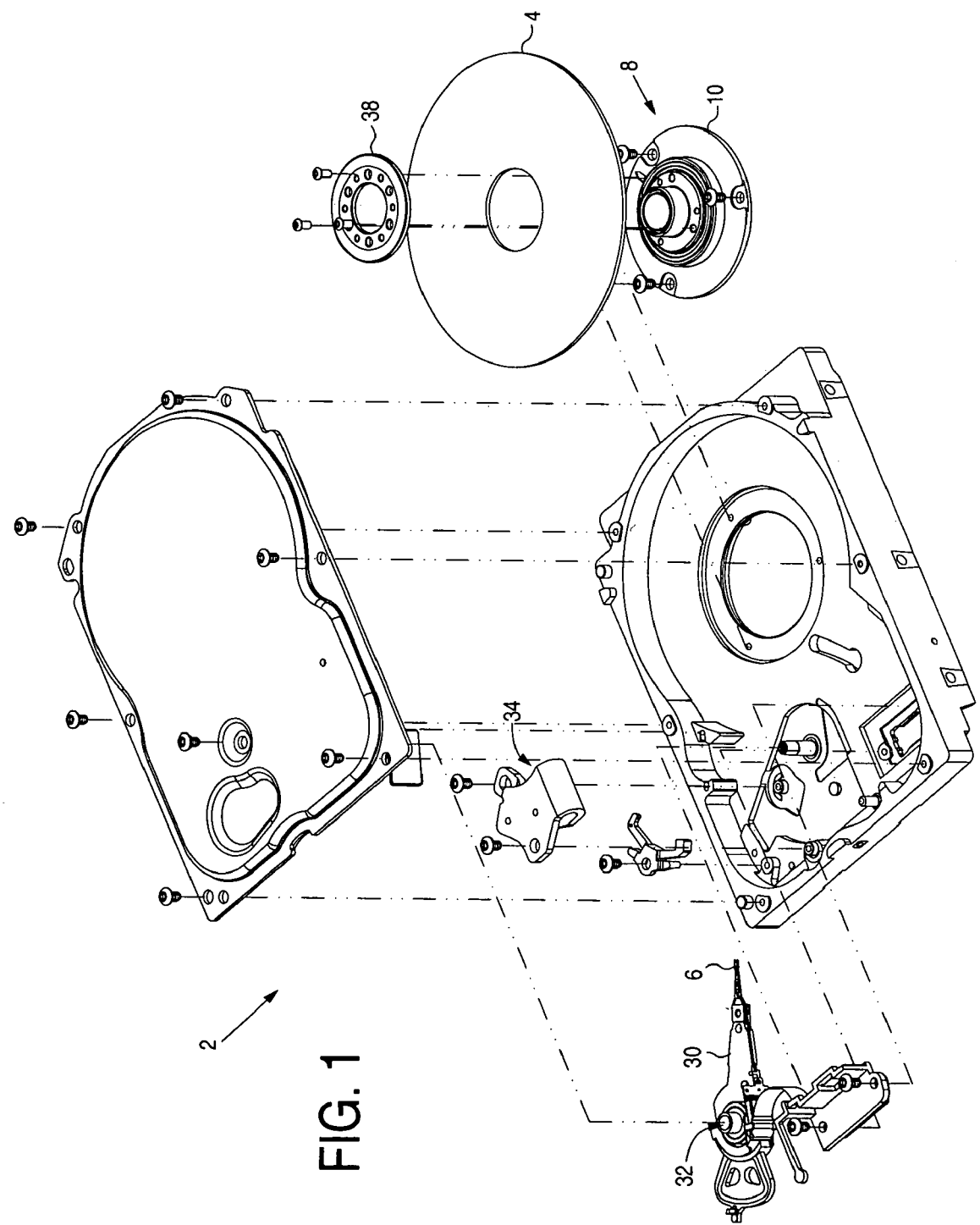
FIG. 1 shows an exploded view of a disk drive according to an embodiment of the present invention comprising a disk and spindle motor for rotating the disk, the spindle motor comprising a plurality of windings and a ring-shaped shield for reducing voltage coupled from the windings to a surface of the disk.

FIG. 1 shows an exploded view of a disk drive 2 according to an embodiment of the present invention comprising a disk 4, a head 6 actuated over a surface of the disk 4, and a spindle motor 8 for rotating the disk 4. An example embodiment of the spindle motor 8 shown in the exploded view of FIG. 3A comprises a base 10, a shaft 12 coupled to the base 10, and a ring-shaped stator 14 having a planar alignment substantially parallel with the disk 4. The shaft 12 is disposed axially through the ring-shaped stator 14. The ring-shaped stator 14 comprises a plurality of stator teeth (e.g., 16A–16D), wherein a winding (e.g., 18A–18D) is wound around each stator tooth. When the windings (e.g., 18A–18D) are energized, a voltage emanating from the windings (e.g., 18A–18D) being at least partially coupled to the surface of the disk 4. The spindle motor 8 further comprises a hub 20 comprising a plurality of magnets (e.g., 22A and 22B of FIG. 5A) for interacting with the stator teeth (e.g., 16A–16D) to rotate the hub 20 about the shaft 12 when the windings are energized. The hub 20 comprises a first ring-shaped planar surface 24 (FIG. 5B) positioned over the windings (e.g., 18A–18D) defining a first vertical gap 26 between the windings (e.g., 18A–18D) and the hub 20. A first ring-shaped shield 28 is disposed in the first vertical gap 26 between the windings (e.g., 18A–18D) and the hub 20 to reduce the voltage coupled to the surface of the disk 4.

The head 6 in the disk drive 2 of FIG. 1 is coupled to a distal end of an actuator arm 30 which is rotated about a pivot 32 by a voice coil motor 34 in order to actuate the head 6 radially over the disk 4 while the spindle motor 8 rotates the disk 4 at a predetermined angular velocity. In one embodiment, the head 6 comprises a magnetoresistive (MR) read element which is more susceptible to damage due to voltage coupling from the spindle motor windings as compared to an inductive read element.

Figure 2:
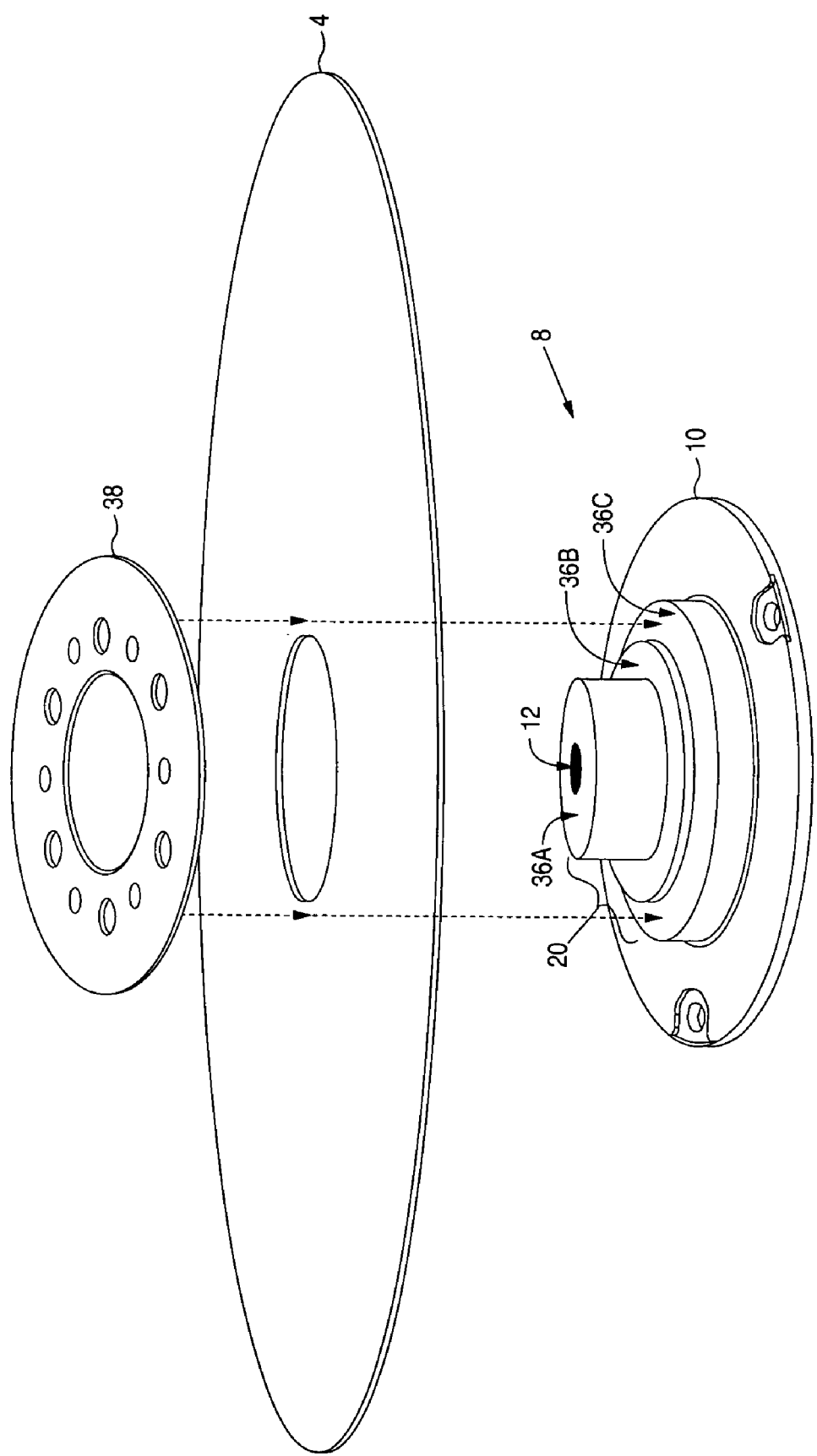
FIG. 2 shows a disk being clamped to a ring-shaped mounting surface of a hub of the spindle motor according to an embodiment of the present invention.

FIG. 2 shows an embodiment wherein the hub 20 of the spindle motor 8 comprises a multi-tier configuration including ring-shaped surface 36A, ring-shaped surface 36B, and ring-shaped surface 36C. The disk 4 seats on ring-shaped surface 36C with the ring-shaped surface 36B being disposed axially through the aperture in the center of the disk 4. A beveled surface of a disk clamp 38 presses the disk 4 onto the ring-shaped surface 36C, while screws are inserted through apertures of the disk clamp 38 and screwed into the ring-shaped surface 36B thereby clamping the disk 4 to the hub 20. During operation the spindle motor 8 rotates the hub 20 (and clamped disk 4) about the fixed shaft 12.

Figure 3A:
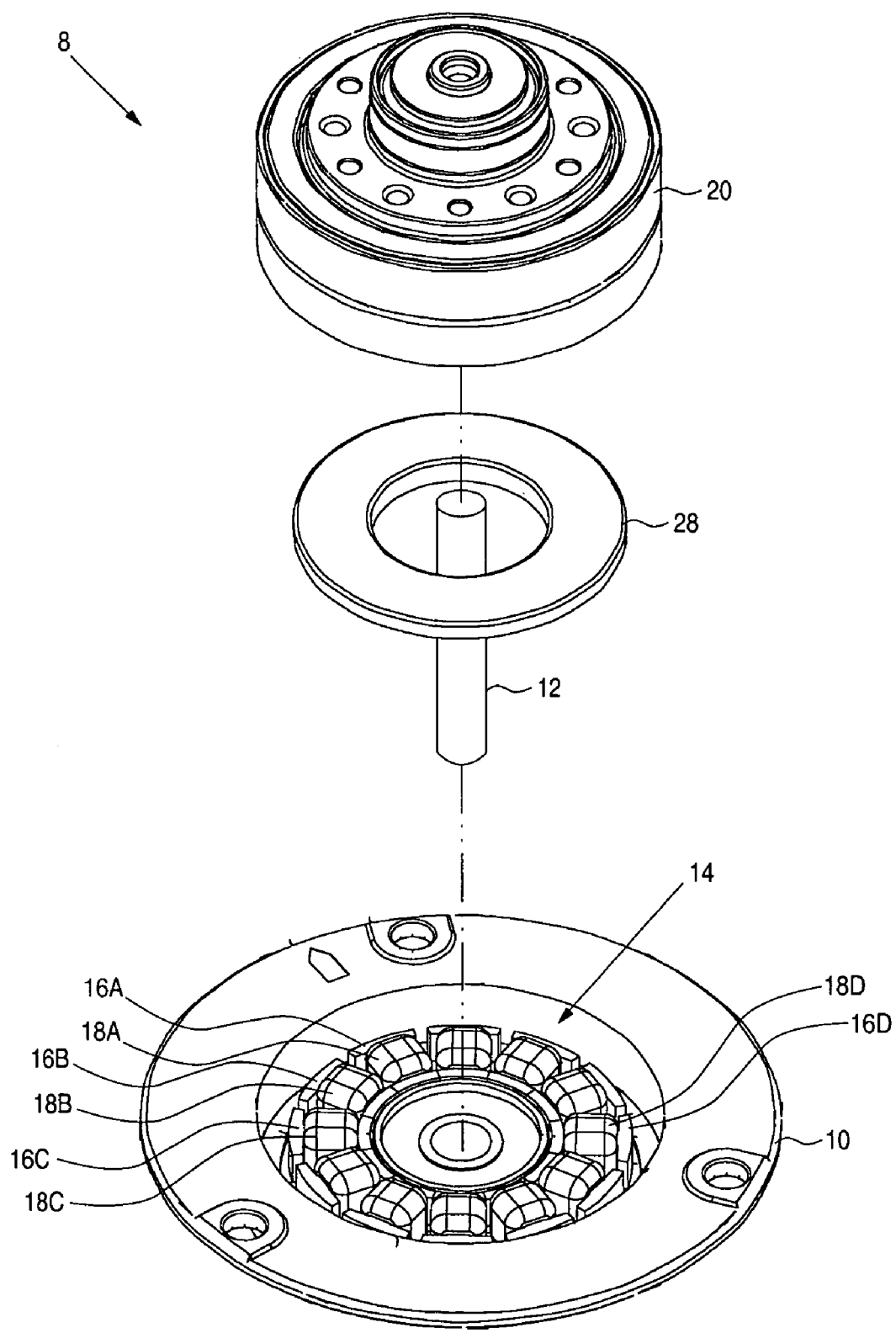
FIG. 3A shows an exploded view of the spindle motor according to an embodiment of the present invention, including a ring-shaped shield disposed between the windings and the hub to reduce voltage coupled to the surface of the disk.

The first ring-shaped shield 28 of FIG. 3A comprises any suitable material, and in one embodiment, comprises a metal. In an embodiment shown in FIG. 3B, the spindle motor 8 further comprises a first ring-shaped insulator 40 disposed between the first ring-shaped shield 28 and the windings (e.g., 18A–18D). The ring-shaped insulator 40 may be a separate element installed into the spindle motor 8 during the assembly process. In an alternative embodiment, the ring-shaped insulator 40 is attached to, or otherwise integrated with, the first ring-shaped shield 28 using, for example, any suitable adhesive. In this embodiment, the first ring-shaped shield 28 and integrated ring-shaped insulator 40 are installed together during the assembly process.

Figure 3B:
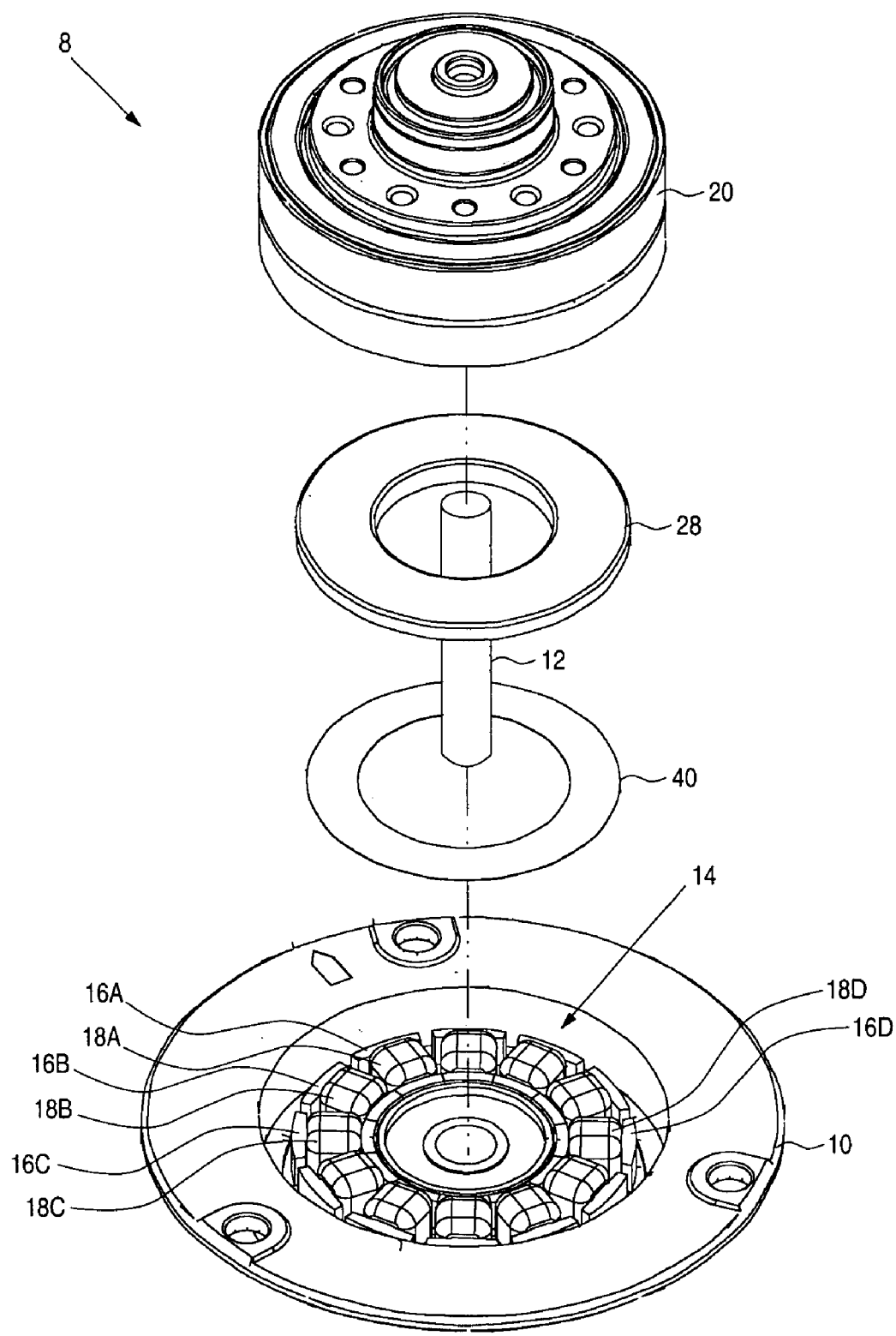
FIG. 3B shows an embodiment of the present invention wherein the spindle motor further comprises a ring-shaped insulator disposed between the ring-shaped shield and the windings to insulate the ring-shaped shield from the windings.
Figure 4:
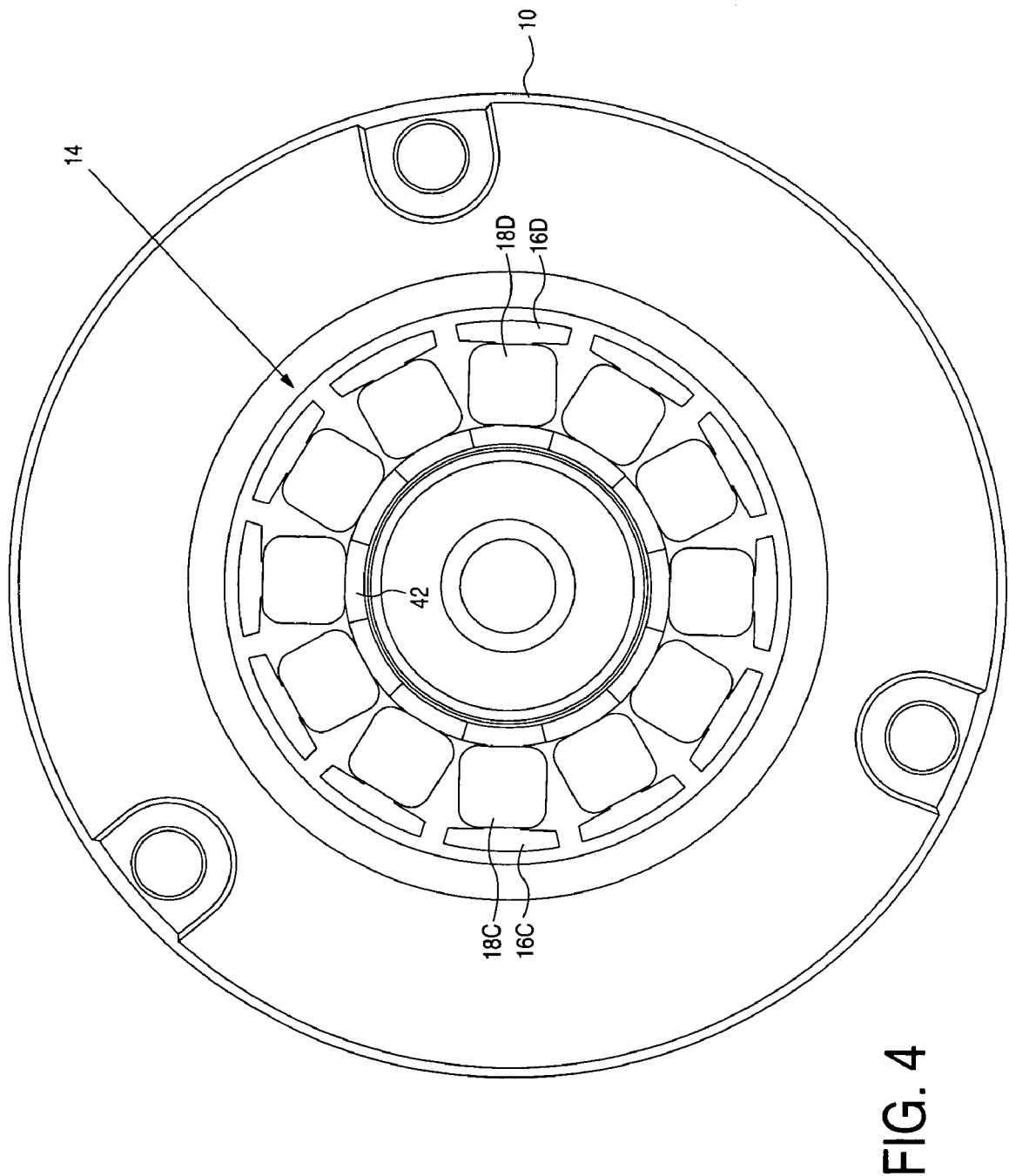
FIG. 4 shows an example embodiment of a ring-shaped stator comprising a ring-shaped inner diameter and a plurality of stator teeth extending radially outward, wherein a winding is wound around each stator tooth.

FIG. 4 shows a magnified top plan view of the base 10 and ring-shaped stator 14 used in the spindle motor 8 of FIGS. 3A and 3B. In this embodiment, the ring-shaped stator 14 comprises a ring-shaped inner diameter 42 and the plurality of stator teeth (e.g., 16C–16D) extend radially outward from the ring-shaped inner diameter 42.

Figure 5A:
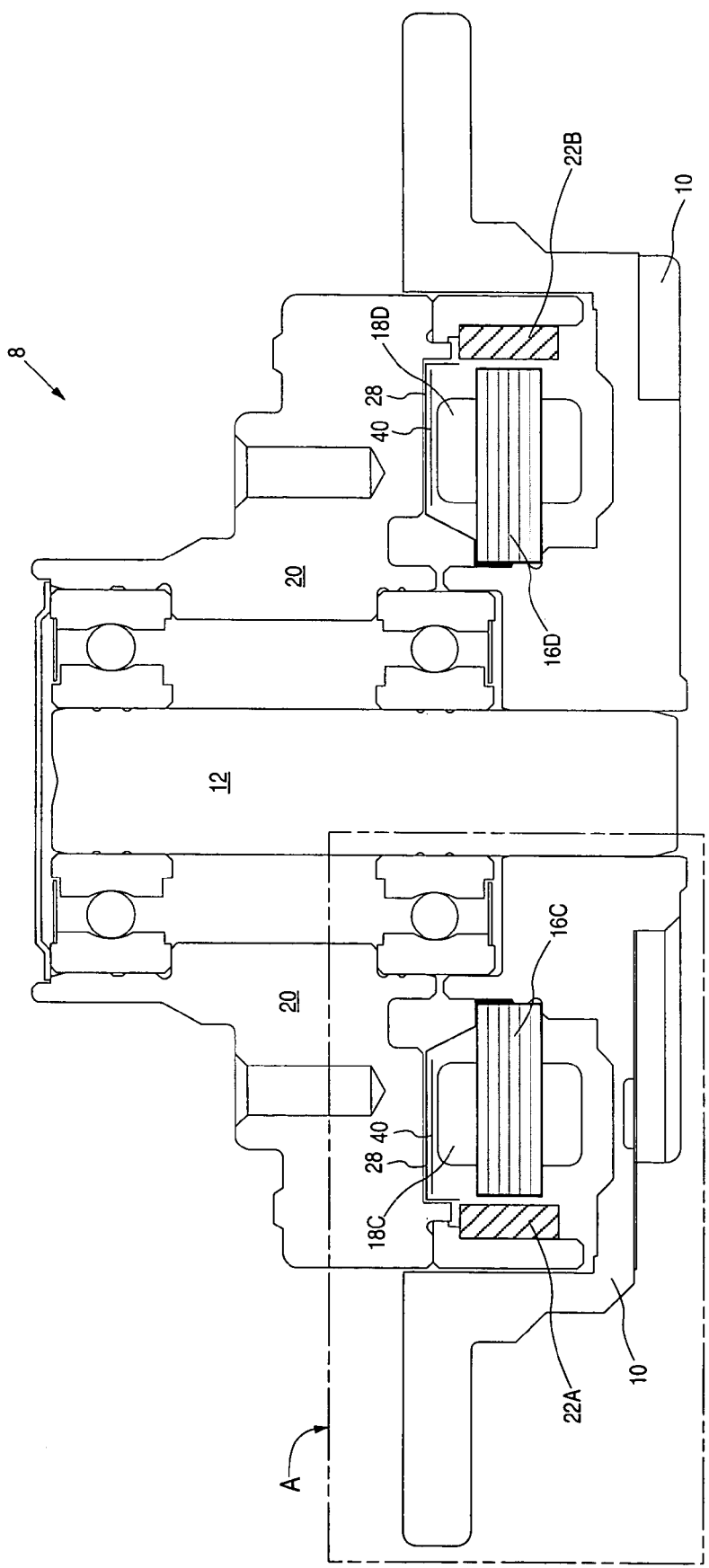
FIG. 5A shows a cross sectional view of the spindle motor of FIG. 3B, including a plurality of magnets attached to an interior surface of the hub which envelop the stator teeth.
Figure 5B:
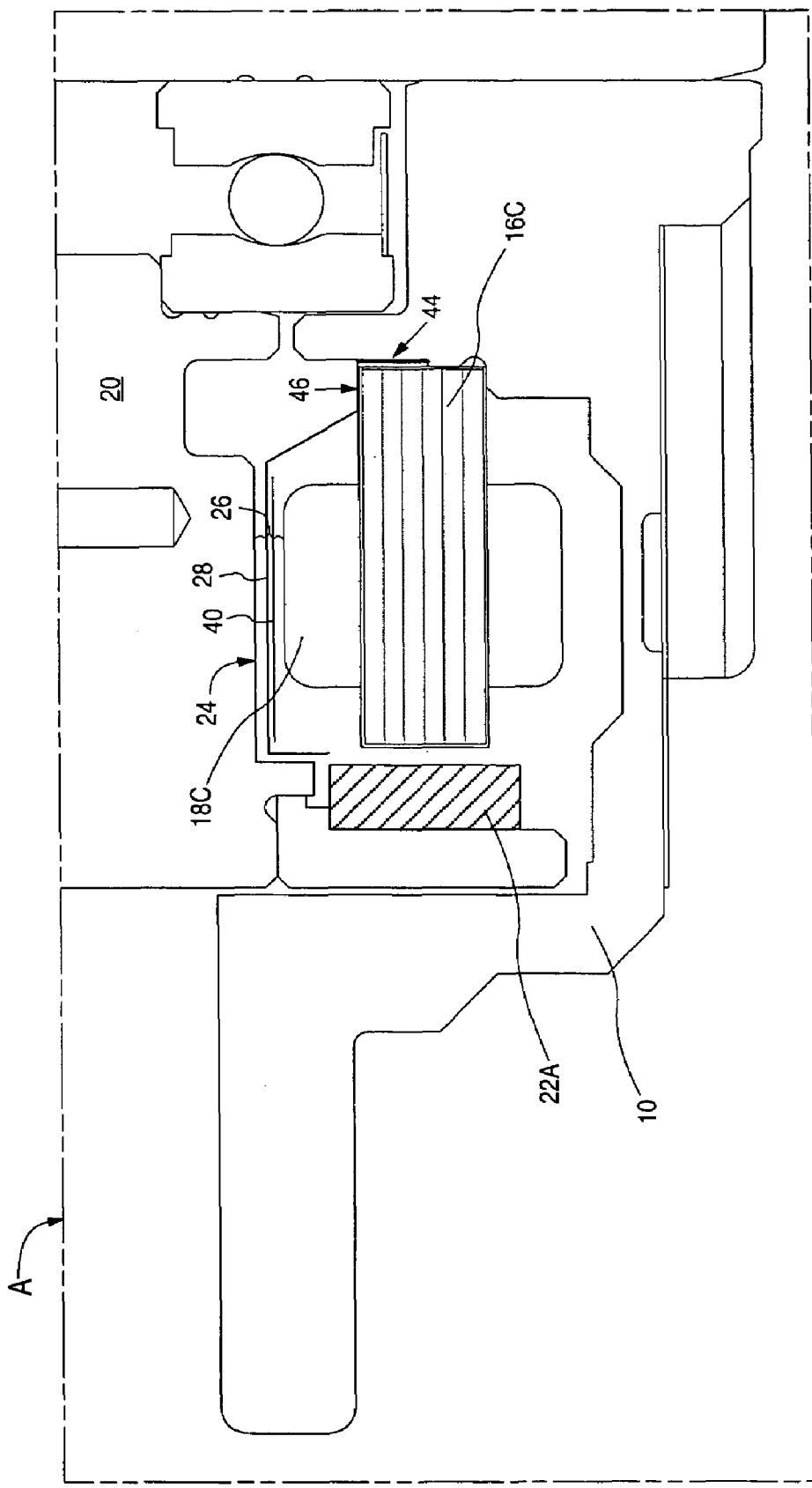
FIG. 5B shows a magnified cross sectional view of the spindle motor shown in FIG. 5A, including a stator tooth, winding, and shield disposed between the top of the winding and the hub.

FIG. 5A shows a cross sectional view of the spindle motor of FIG. 3B, and FIG. 5B shows a magnified cross sectional area A. As shown in FIG. 5B, in one embodiment the first ring-shaped shield 28 is coupled to the base 10 at point 44 in order to ground the first ring-shaped shield 28 to the base 10. In an alternative embodiment, the first ring-shaped shield 28 is grounded to the shaft 12 of the spindle motor (see FIG. 7). Also in the embodiment of FIG. 5B, the stator tooth 16C is coupled to the base 10 (through the first ring-shaped shield 28) at point 46, thereby grounding the ring-shaped stator 14 to the base 10. In an alternative embodiment, the ring-shaped stator 14 is grounded to the shaft 12 of the spindle motor (see FIG. 7). Grounding the first ring-shaped shield 28 and/or the ring-shaped stator 14 to the base 10 or shaft 12 further reduces the voltage coupled from the windings (e.g., 18C–18D) to the surface of the disk 4.

In the embodiment of the spindle motor 8 shown in FIG. 5A, the hub 20 comprises a substantially cylindrical shape having a substantially closed top end and a substantially open bottom end. An interior circumferential surface of the hub proximate the substantially open bottom end comprises a plurality of magnets (e.g., 22A and 22B). A diameter of the hub 20 proximate the magnets (e.g., 22A and 22B) is greater than a diameter of the ring-shaped stator 14. The magnets (e.g., 22A and 22B) interact with a distal end of the stator teeth (e.g., 16C and 16D) to rotate the hub 20 about the shaft 12 when the windings (e.g., 18C and 18D) are energized with current.

Figure 6:
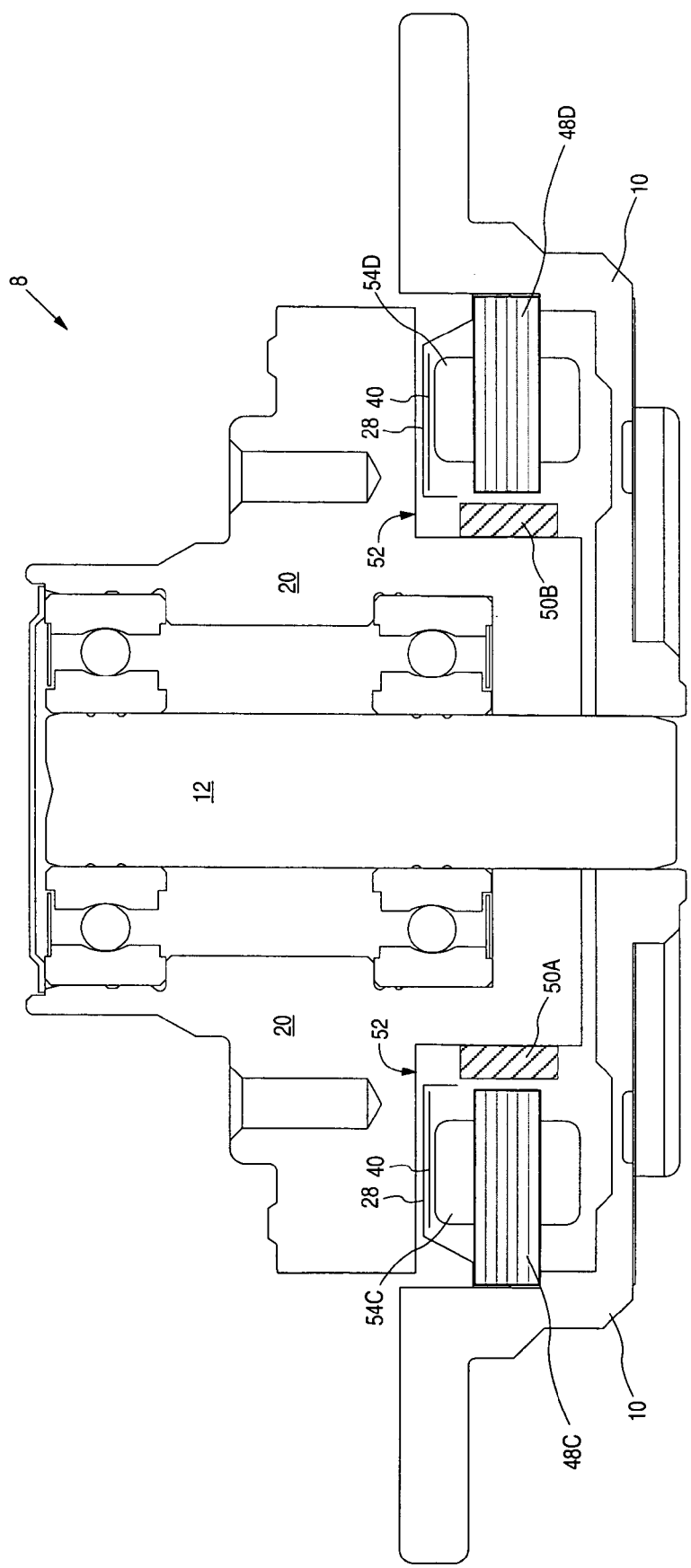
FIG. 6 shows an embodiment of an inside-out spindle motor wherein the magnets are attached to an exterior surface of the hub and the stator teeth envelope the magnets.

FIG. 6 shows an inside-out spindle motor 8 according to an alternative embodiment of the present invention. In this embodiment, the ring-shaped stator comprises a ring-shaped outer diameter wherein the plurality of stator teeth (e.g., 48C and 48D) extend radially inward from the ring-shaped outer diameter, and the hub 20 comprises a substantially cylindrical shape. An exterior circumferential surface of the hub 20 comprises a plurality of magnets (e.g., 50A and 50B), and a diameter of the hub 20 proximate the magnets (e.g., 50A and 50B) is less than a diameter of the ring-shaped stator. A diameter of the hub 20 above the magnets (e.g., magnets 50A and 50B) extends radially outward to form the first ring-shaped planar surface 52 positioned over the windings (e.g., 54C and 54D) defining the first vertical gap between the windings (e.g., 54C and 54D) and the hub 20. The magnets (e.g., 50A and 50B) interact with a distal end of the stator teeth (e.g., 48C and 48D) to rotate the hub 20 about the shaft 12 when the windings (e.g., 54C and 54D) are energized.

Figure 7:
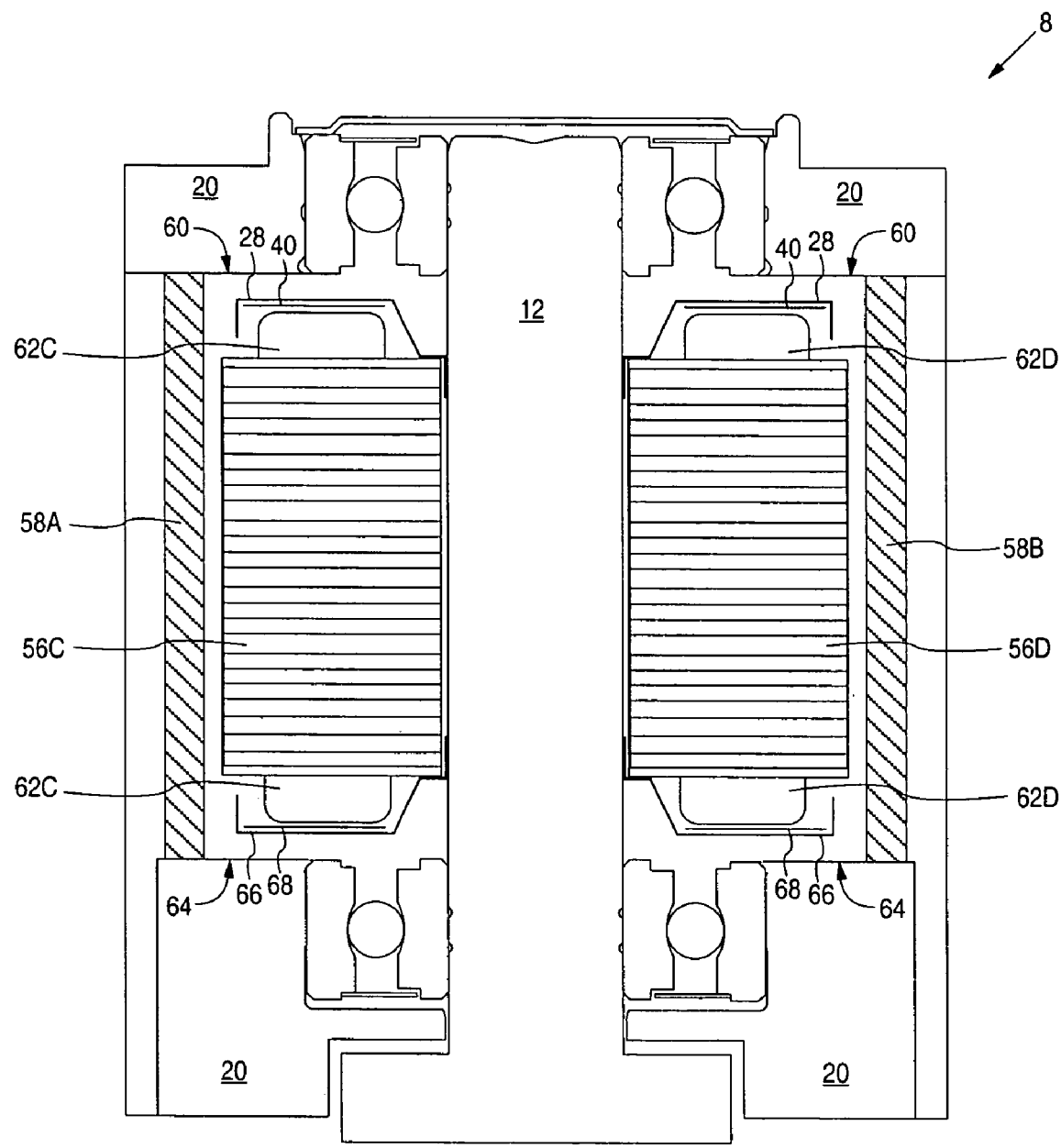
FIG. 7 shows an embodiment of a bell-shaped spindle motor comprising a hub having a substantially closed top end and a substantially closed bottom end, wherein a second ring-shaped shield is disposed between the bottom of the windings and the substantially closed bottom end of the hub.

FIG. 7 shows a bell-shaped spindle motor 8 according to an alternative embodiment of the present invention. In this embodiment, the ring-shaped stator comprises a ring-shaped inner diameter and the plurality of stator teeth (e.g., 56C and 56D) extend radially outward from the ring-shaped inner diameter. The hub 20 comprises a substantially cylindrical shape comprising a substantially closed top end and a substantially closed bottom end. An interior circumferential surface of the hub 20 comprises a plurality of magnets (e.g., 58A and 58B), and a diameter of the hub 20 proximate the magnets (e.g., 58A and 58B) is greater than a diameter of the ring-shaped stator. The substantially closed top end forms the first ring-shaped planar surface 60 positioned over the windings (e.g., 62C and 62D) defining the first vertical gap between the windings (e.g., 62C and 62D) and the hub 20. The substantially closed bottom end forms a second ring-shaped planar surface 64 positioned below the windings (e.g., 62C and 62D) defining a second vertical gap between the windings (e.g., 62C and 62D) and the hub 20. A second ring-shaped shield 66 is disposed in the second vertical gap between the windings (e.g., 62C and 62D) and the hub 20 to reduce the voltage coupling to the surface of the disk 4. The magnets (e.g., 58A and 58B) interact with a distal end of the stator teeth (e.g., 56C and 56D) to rotate the hub 20 about the shaft 12 when the windings (e.g., 62C and 62D) are energized. The embodiment of FIG. 7 also employs a second ring-shaped insulator 68 disposed between the second ring-shaped shield 66 and the windings (e.g., 62C and 62D).

We claim:
1. A disk drive comprising:
(a) a disk;
(b) a head actuated over a surface of the disk;
(c) a spindle motor for rotating the disk, the spindle motor comprising:
a base;
a shaft coupled to the base;
a ring-shaped stator having a planar alignment substantially parallel with the disk, wherein:
the shaft is disposed axially through the ring-shaped stator;
the ring-shaped stator comprises a plurality of stator teeth;
a winding is wound around each stator tooth; and
when the windings are energized, a voltage emanating from the windings being at least partially coupled to the surface of the disk;
(d) a hub comprising a plurality of magnets for interacting with the stator teeth to rotate the hub about the shaft when the windings are energized, the hub comprising a first ring-shaped planar surface positioned over the windings defining a first vertical gap between the windings and the hub; and

(e) a first ring-shaped shield disposed in the first vertical gap between the windings and the hub to reduce the voltage coupled to the surface of the disk,
wherein the first ring-shaped shield is grounded to at least one of the base and the shaft to reduce the voltage coupled to the surface of the disk.
2. The disk drive as recited in claim 1, wherein the first ring-shaped shield comprises a metal.
3. The disk drive as recited in claim 1, further comprising a ring-shaped insulator disposed between the first ring-shaped shield and the windings.
4. The disk drive as recited in claim 1, wherein the ring-shaped stator is grounded to the base to reduce the voltage coupled to the surface of the disk.
5. The disk drive as recited in claim 1, wherein the ring-shaped stator is grounded to the shaft to reduce the voltage coupled to the surface of the disk.
6. The disk drive recited in claim 1, wherein:
(a) the ring-shaped stator comprises a ring-shaped inner diameter and the plurality of stator teeth extend radially outward from the ring-shaped inner diameter; and
(b) the hub comprises a substantially cylindrical shape comprising a substantially closed top end and a substantially open bottom end, wherein:
an interior circumferential surface of the hub proximate the substantially open bottom end comprises the plurality of magnets;
a diameter of the hub proximate the magnets is greater than a diameter of the ring-shaped stator; and
the magnets interact with a distal end of the stator teeth to rotate the hub about the shaft when the windings are energized.
7. The disk drive recited in claim 1, wherein:
(a) the ring-shaped stator comprises a ring-shaped outer diameter and the plurality of stator teeth extend radially inward from the ring-shaped outer diameter; and
(b) the hub comprises a substantially cylindrical shape, wherein:
an exterior circumferential surface of the hub comprises the plurality of magnets;
a diameter of the hub proximate the magnets is less than a diameter of the ring-shaped stator;
a diameter of the hub above the magnets extends radially outward to form the first ring-shaped planar surface positioned over the windings defining the first vertical gap between the windings and the hub; and
the magnets interact with a distal end of the stator teeth to rotate the hub about the shaft when the windings are energized.
8. The disk drive recited in claim 1, wherein:
(a) the ring-shaped stator comprises a ring-shaped inner diameter and the plurality of stator teeth extend radially outward from the ring-shaped inner diameter; and
(b) the hub comprises a substantially cylindrical shape comprising a substantially closed top end and a substantially closed bottom end, wherein:
an interior circumferential surface of the hub comprises the plurality of magnets;
a diameter of the hub proximate the magnets is greater than a diameter of the ring-shaped stator;
the substantially closed top end forms the first ring-shaped planar surface positioned over the windings defining the first vertical gap between the windings and the hub;

the substantially closed bottom end forms a second ring-shaped planar surface positioned below the windings defining a second vertical gap between the windings and the hub;

a second ring-shaped shield is disposed in the second vertical gap between the windings and the hub to reduce the voltage coupled to the surface of the disk; and the magnets interact with a distal end of the stator teeth to rotate the hub about the shaft when the windings are energized.

9. The disk drive as recited in claim 8, further comprising a ring-shaped insulator disposed between the second ring-shaped shield and the windings.

10. A spindle motor for rotating a disk in a disk drive, the disk drive comprising a head actuated over a surface of the disk, the spindle motor comprising:
   (a) a base;
   (b) a shaft coupled to the base;
   (c) a ring-shaped stator having a planar alignment substantially parallel with the disk, wherein:
      the shaft is disposed axially through the ring-shaped stator;
      the ring-shaped stator comprises a plurality of stator teeth;
      a winding is wound around each stator tooth; and
      when the windings are energized, a voltage emanating from the windings being at least partially coupled to the surface of the disk;
   (d) a hub comprising a plurality of magnets for interacting with the stator teeth to rotate the hub about the shaft when the windings are energized, the hub comprising a first ring-shaped planar surface positioned over the windings defining a first vertical gap between the windings and the hub; and
   (e) a first ring-shaped shield disposed in the first vertical gap between the windings and the hub to reduce the voltage coupled to the surface of the disk,
   wherein the first ring-shaped shield is grounded to at least one of the base and the shaft to reduce the voltage coupled to the surface of the disk.

11. The spindle motor as recited in claim 10, wherein the first ring-shaped shield comprises a metal.

12. The spindle motor as recited in claim 10, further comprising a ring-shaped insulator disposed between the first ring-shaped shield and the windings.

13. The spindle motor as recited in claim 10, wherein the ring-shaped stator is grounded to the base to reduce the voltage coupled to the surface of the disk.

14. The spindle motor as recited in claim 10, wherein the ring-shaped stator is grounded to the shaft to reduce the voltage coupled to the surface of the disk.

15. The spindle motor recited in claim 10, wherein:
   (a) the ring-shaped stator comprises a ring-shaped inner diameter and the plurality of stator teeth extend radially outward from the ring-shaped inner diameter; and
   (b) the hub comprises a substantially cylindrical shape comprising a substantially closed top end and a substantially open bottom end, wherein:
      an interior circumferential surface of the hub proximate the substantially open bottom end comprises the plurality of magnets;
      a diameter of the hub proximate the magnets is greater than a diameter of the ring-shaped stator; and
      the magnets interact with a distal end of the stator teeth to rotate the hub about the shaft when the windings are energized.

16. The spindle motor recited in claim 10, wherein:
   (a) the ring-shaped stator comprises a ring-shaped outer diameter and the plurality of stator teeth extend radially inward from the ring-shaped outer diameter; and
   (b) the hub comprises a substantially cylindrical shape, wherein:
      an exterior circumferential surface of the hub comprises the plurality of magnets;
      a diameter of the hub proximate the magnets is less than a diameter of the ring-shaped stator;
      a diameter of the hub above the magnets extends radially outward to form the first ring-shaped planar surface positioned over the windings defining the first vertical gap between the windings and the hub; and
      the magnets interact with a distal end of the stator teeth to rotate the hub about the shaft when the windings are energized.

17. The spindle motor recited in claim 10, wherein:
   (a) the ring-shaped stator comprises a ring-shaped inner diameter and the plurality of stator teeth extend radially outward from the ring-shaped inner diameter; and
   (b) the hub comprises a substantially cylindrical shape comprising a substantially closed top end and a substantially closed bottom end, wherein:
      an interior circumferential surface of the hub comprises the plurality of magnets;
      a diameter of the hub proximate the magnets is greater than a diameter of the ring-shaped stator;
      the substantially closed top end forms the first ring-shaped planar surface positioned over the windings defining the first vertical gap between the windings and the hub;
      the substantially closed bottom end forms a second ring-shaped planar surface positioned below the windings defining a second vertical gap between the windings and the hub;
      a second ring-shaped shield is disposed in the second vertical gap between the windings and the hub to reduce the voltage coupled to the surface of the disk; and
      the magnets interact with a distal end of the stator teeth to rotate the hub about the shaft when the windings are energized.

18. The spindle motor as recited in claim 17, further comprising a ring-shaped insulator disposed between the second ring-shaped shield and the windings.

* * * * *